July 21, 1925.
J. R. SHORT
DUSTING BOX
Original Filed Sept. 23, 1922   2 Sheets-Sheet 1
1,546,411
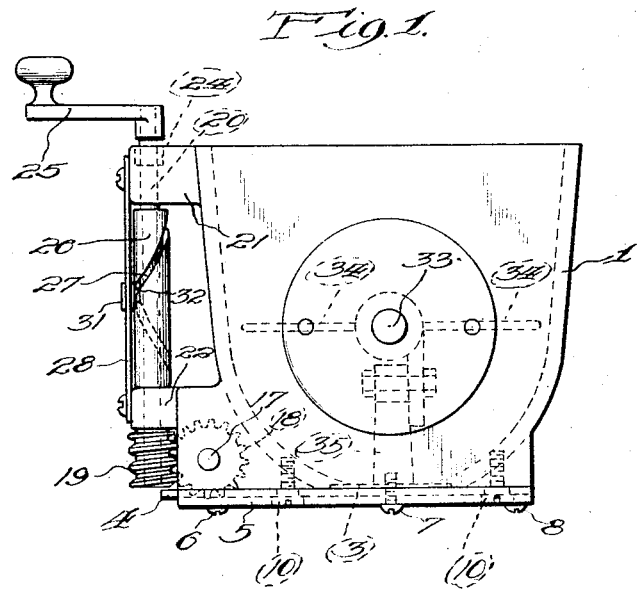
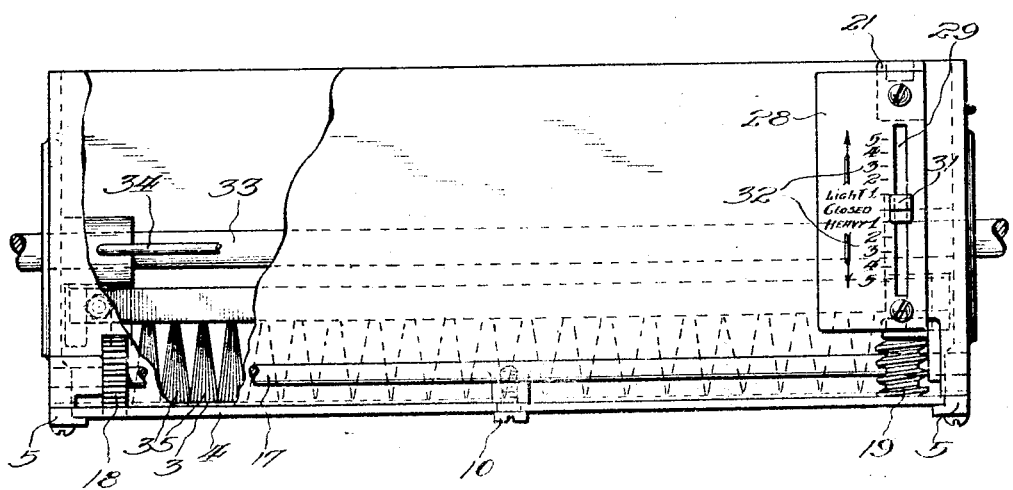

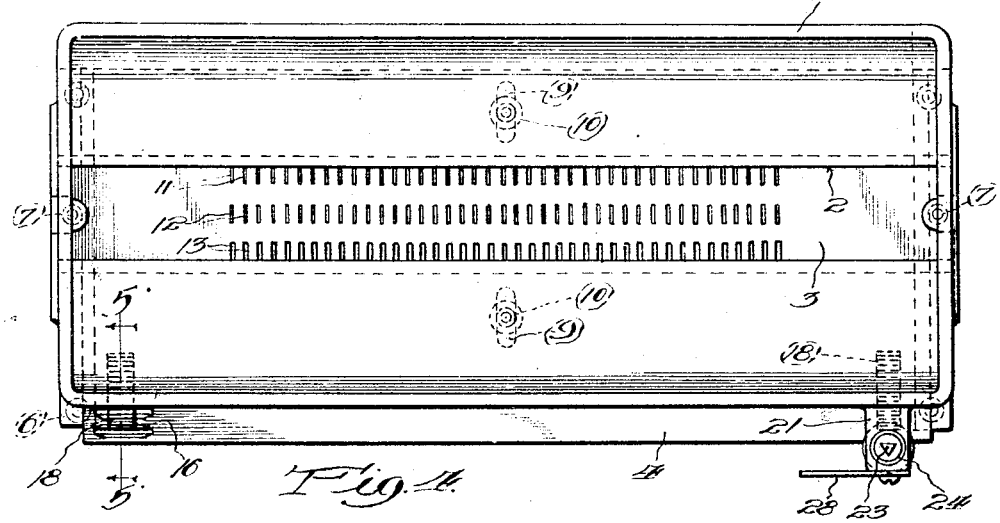

Patented July 21, 1925.

1,546,411

UNITED STATES PATENT OFFICE.

JEFFREY R. SHORT, OF LA GRANGE, ILLINOIS, ASSIGNOR TO J. R. SHORT MILLING COMPANY, A CORPORATION OF ILLINOIS.

DUSTING BOX.

Application filed September 23, 1922, Serial No. 590,008. Renewed December 26, 1924.

*To all whom it may concern:*

Be it known that I, JEFFREY R. SHORT, a citizen of the United States, residing at La Grange, county of Cook, State of Illinois, have invented a certain new and useful Improvement in Dusting Boxes, and declare the following to be a full, clear, and exact description of the same, such as will enable others skilled in the art to which it pertains to make and use the same, reference being had to the accompanying drawings, which form a part of this specification.

In the manufacture of bakery products it is necessary that the dough or the machinery, or both, be dusted with a dry flour at intervals during the progress of the dough from the mixer to the oven, for the purpose of preventing the dough from sticking to the machinery or apparatus through which the dough passes.

The object of the present invention is to produce a simple and novel device by means of which the dusting flour may be quickly and conveniently applied in quantities regulated according to the characteristics of the dusting flour and of the dough and machinery; whereby the dusting flour may always be applied uniformly, in just the right quantities, and without waste.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is an end elevation of a dusting box arranged in accordance with my invention;

Fig. 2 is a front elevation of the box, a portion being broken away to expose the interior;

Fig. 3 is a top plan view of the box from which the rotating brush and agitator have been removed;

Fig. 4 is a top plan view of the sliding plate for controlling the discharge of the flour, portions thereof being broken away;

Fig. 5 is a section taken approximately on line 5—5 of Fig. 3;

Fig. 6 is a transverse section through the bottom portion of a modified form of box; and Fig. 7 is a plan view of a fragment of a modified form of perforated bottom for the box.

Referring to Figures 1 to 5 of the drawings, 1 represents a box or container of any usual or suitable construction, having a rounded bottom, the central portion of which is cut away to provide a comparatively wide opening 2 extending throughout the length of the box. This opening is closed by means of a perforated plate 3, below which and in contact with the under face thereof is a sliding controlling plate 4. In the arrangement shown the plate 4 is held in position by means of L-shaped bars 5 fastened to the under side of the box at the ends of the latter; the plate resting on the horizontal arms or flanges of these bars. In the arrangement shown each of the supporting and guide bars is held in place by means of three screws, 6, 7 and 8, passing through the same into the box. The intermediate screws 7 pass also through the ends of the perforated plate 3 so as to fasten this plate rigidly to the box. The parts are so proportioned that the sliding plate is held by the supporting bars against the bottom of the box, leaving the plate free to slide underneath the box in the direction of the length of the bars. In order to prevent the middle portion of the sliding plate from sagging and thus dropping away from the bottom of the box, I have provided the sliding plate with slots 9 elongated in the direction of the movement of the plate, and have passed screws 10 through these slots into the body of the box; the screws holding the middle portion of the plate up against the bottom of the box without interfering with the sliding movements of the plate.

The perforated plate is provided with a series of rows or perforations, the rows extending longitudinally of the plate. In the arrangement shown in Fig. 3 there are three rows of perforations indicated at 11, 12 and 13. The perforations are all in the form of slots extending transversely of the box, that is, in the direction of movement of the controlling plate 4. The perforations or slots are preferably made quite fine but need not all be of the same size. In the arrangement shown, the slots in the rows 11 and 12 are alike, while the slots in the row 13 are wider than the others. The controlling plate is provided with two parallel slots 14 and 15, extending lengthwise thereof, each slot having a width equal to the length of one of the slots in the perforated bottom of the box, and the length equal to the length of the perforated portion of the bottom of the box. The spacing between the rows of perforations in the bottom of the box and between the slots 14 and 15 in the controlling plate is equal to the width of one of the slots 14 or 15. Consequently the plate 4 may be so positioned that the slots 14 and 15 therein will lie underneath the two unperforated strips arranged between the rows of perforations in the perforated bottom of the box, and thus seal the bottom of the box; or the slots 14 and 15 may be caused to lie partly or wholly underneath the rows 11 and 12 or the rows 12 and 13. When the slots 14 and 15 register fully with the rows 11 and 12 the row of slots or perforations 13 will be covered by a solid portion of the plate 4 and the contents of the box may be discharged through the rows of perforations 11 and 12. By moving the controlling plate, any desired portions of the slots in the rows 11 and 12 may be covered up so as to decrease the size of the openings through which the contents of the box may be fed. In the same way, the controlling plate may be moved into a position in which the row of slots 11 is covered, while all or any desired portion of each of the slots in the rows 12 and 13 is uncovered. Since the slots in the row 13 are wider than those in the other rows, it will be seen that a more rapid discharge of dusting flour may be obtained, or a coarser dusting flour can be discharged than where the rows 11 and 12 are brought into play.

While the perforations in the bottom plate are shown as taking the form of slots, in Fig. 3, I may substitute a number of small holes for each slot, as indicated in Fig. 7; 30 representing the thin bottom plate and 110, 120 and 130 representing the rows of perforations, in which each row actually consists of a plurality of rows of small perforations. In this form of bottom plate, some of the holes may be larger than others; all of the holes in the row 130 being larger than those in the other two rows.

It is desirable that the controlling plate be readily adjustable and that it be held in any position into which it may be adjusted; and it is furthermore desirable that the user of the box be able to see at a glance what the condition of the discharge outlets from the box is. I have therefore provided a simple and novel adjusting means for the controlling plate and an indicator for showing the position of the plate at all times. To this end I have cut into the upper face of the controlling plate, near the front edge, and adjacent to the ends thereof, rack teeth 16, and have mounted on the front of the box a transverse shaft 17, having at the ends pinions 18 which mesh with these rack teeth. One of these pinions may also serve as a worm wheel meshing with a worm 19 on a vertical shaft 20 mounted on suitable bearings 21 and 22, at the front side and near one end of the box. The upper end of the shaft 20 terminates in a non-circular portion 23 lying within a socket 24 in the top of the bearing bracket 20, so as to make it very difficult to turn the shaft unless the person trying to turn the same be provided with a suitable key or handle 25 which will fit down into the socket and over the non-circular end of the shaft. By turning the shaft 20 in one direction or the other, the sliding controlling plate may be shifted from a position in which the bottom of the box is sealed, to various other positions in which all or any portion of the rows of perforations 11 and 12 or 12 and 13 are uncovered. Fixed to the shaft 20 is a sleeve 26 provided with an external slot 27 extending spirally along the same. Just in front of this sleeve and supported conveniently by being fixed to the bearing lugs 21 and 22 is a plate 28 provided with an elongated vertical slot 29. In the slot 29 slides a block 31 having a finger or projection 32 extending into the spiral groove in the sleeve. As the adjusting shaft is rotated, the block 31 is moved up or down, depending on the direction of rotation of the shaft. The plate 28 is provided with suitable graduations or indices 32, which co-operate with the sliding block to disclose the position of the controlling plate.

Although it forms no part of my invention, because commonly used in dusting boxes, I have shown an agitator shaft 33 extending lengthwise through the box, this shaft being provided with suitable agitating arms 34 and with a suitable brush 35, which sweeps over the perforated bottom of the box when the shaft 33 is rotated.

In the construction shown in Figs. 1 to 5, the perforated bottom is shown as being flat. Therefore, if the brush is to remain in contact with the perforated plate at all points while passing over the same, it must bear down with considerable pressure when directly above the center of the plate. In Fig. 6 I have shown an arrangement in which the perforated bottom is a continuation of the cylindrical surface of the adjacent portions of the box, so that the brush will touch all portions of the perforated plate with equal pressure, thus avoiding wear on the brush. Referring to this figure, 40 represents the box and 41 the curved perforated bottom plate. The controlling plate 42 is also curved so as to fit against the outside cylindrical surface of the box, the guides 43 corresponding to the bars 5 in the first form, and are similarly curved. The pinions 18 mesh with rack teeth 44 on the outer or under side of the guide plate instead of on the inner or upper side as in the first form.

It will be seen that the perforated bottom plate of the box, whether flat or curved, may be made of comparatively thin sheet metal, because it is, in effect, backed by the comparatively heavy sliding plate; and consequently the perforations or slits or slots may be formed by ordinary punching processes and without resorting to expensive drilling operations. Furthermore, even though the passages through the perforated plate be quite small, there will be little danger or clogging them when the proper grade of dusting flour is used, because of their comparative shortness due to the thinness of the plate. These factors, together with the means for nicely adjusting the controlling plate and the indicator for showing the position of the latter, serve to make my improved box comparatively cheap in construction and very convenient, efficient and reliable in operation.

While I have illustrated and described with particularity only a single preferred form of my invention with a slight modification, I do not desire to be limited to the exact structural details thus illustrated and described; but intend to cover all forms and arrangements which come within the terms employed in the definitions of my invention constituting the appended claims.

I claim:

1. A dusting box having in the bottom three rows of perforations, the perforations in one of the outermost rows being larger than those in another row, and a controlling plate underlying and slidably engaged with the bottom of the box, said plate having two slots so placed that in one position of the plate they lie between the rows of perforations, while in other positions they uncover part or all of the perforations in the middle row and in one outside row, and in still other positions they uncover part or all of the perforations in the middle row and in the other outside row.

2. A dusting box having an opening in the bottom, a perforated sheet metal plate extending across said opening, guides overlying the ends of said plate and secured to the box, a slotted controlling plate arranged in said guide and engaged with the under side of said perforated plate, said controlling plate having between the ends thereof slots extending parallel with said guides, and holding devices passing through the last-mentioned slots into the box.

In testimony whereof, I sign this specification.

JEFFREY R. SHORT.